US009190182B2

(12) United States Patent
Mellor

(10) Patent No.: US 9,190,182 B2
(45) Date of Patent: Nov. 17, 2015

(54) RADIATION IMAGING APPARATUS

(75) Inventor: Matthew Paul Mellor, Cockermouth (GB)

(73) Assignee: CREATE TECHNOLOGIES LIMITED, Cockermouth (GB)

(*) Notice: Subject to any disclaimer, the term of this patent is extended or adjusted under 35 U.S.C. 154(b) by 0 days.

(21) Appl. No.: 13/983,863

(22) PCT Filed: Feb. 8, 2012

(86) PCT No.: PCT/GB2012/000127
§ 371 (c)(1),
(2), (4) Date: Oct. 14, 2013

(87) PCT Pub. No.: WO2012/107720
PCT Pub. Date: Aug. 16, 2012

(65) Prior Publication Data
US 2014/0029731 A1 Jan. 30, 2014

(30) Foreign Application Priority Data

Feb. 8, 2011 (GB) .................................. 1102175.5

(51) Int. Cl.
G01T 1/20 (2006.01)
G21K 1/02 (2006.01)
G01T 1/169 (2006.01)

(52) U.S. Cl.
CPC . *G21K 1/02* (2013.01); *G01T 1/169* (2013.01); *G01T 1/20* (2013.01)

(58) Field of Classification Search
CPC .......................................................... G01T 1/20
USPC ....................... 250/395, 393, 363.04; 378/146
See application file for complete search history.

(56) References Cited

U.S. PATENT DOCUMENTS 4,870,670 A * 9/1989 Geus ............................... 378/87
4,874,951 A 10/1989 Gold et al.
(Continued)

FOREIGN PATENT DOCUMENTS

GB 1004262 A 9/1965
JP S54151884 A 11/1979

OTHER PUBLICATIONS

Great Britain Intellectual Property Office, Search Report, GB1102175.5, Jun. 3, 2011, 2 pages.
(Continued)

Primary Examiner — David Porta
Assistant Examiner — Meenakshi Sahu
(74) Attorney, Agent, or Firm — Quarles & Brady, LLP

(57) ABSTRACT

A radiation imaging apparatus comprising: a radiation detector; a field modulator that modulates the radiation that reaches the detector and is defined by a transmission function; a scanner system for changing the pose of at least the field modulator; and an image reconstruction section that receives a radiation reading from the radiation detector for each of a plurality of angular orientations of the field modulator, and is configured to process the received readings to derive an image representing the amount of radiation originating from each point in an image domain, wherein the transmission function of the field modulator comprises a low transmission region that attenuates radiation incident toward the detector from angular directions defined by that low transmission region, and a high transmission region that transmits to the detector radiation that is incident toward the detector from angular directions defined by that high transmission region, wherein said regions are arranged such that: for each incident angle in the high transmission region, there is at least one incident angle in the low transmission region that is separated therefrom by less than a first angle, wherein said first angle is 10 degrees; and for each incident angle in the high transmission region, the majority of other incident angles in the high transmission region are separated therefrom by more than a second angle, wherein said second angle is 20 degrees.

17 Claims, 4 Drawing Sheets

(56) References Cited

U.S. PATENT DOCUMENTS 6,806,475 B1 * 10/2004 Lightfoot et al. ............. 250/395
2007/0286333 A1 12/2007 Pohan et al.

OTHER PUBLICATIONS

PCT International Search Report, PCT/GB2012/000127, Oct. 25, 2012, 3 pages.

* cited by examiner

RADIATION IMAGING APPARATUS

CROSS-REFERENCE TO RELATED APPLICATIONS

This application represents the national stage entry of PCT International Application No. PCT/GB2012/000127 filed on Feb. 8, 2012, which claims the benefit of Great Britain Patent Application No. 1102175.5 filed on Feb. 8, 2011, the disclosure of each of these applications is hereby incorporated by reference.

The present invention relates to an apparatus for imaging a radiation field.

There are many situations in which it is desirable to be able to 'see' radiation; for example, it might be necessary to locate particularly radioactive material in a radioactive waste management plant, or to assess the contents of a plant handling nuclear fuel. Some forms of radiation are invisible to the human eye and to conventional imaging systems. To address this problem it is necessary to develop a device specifically for imaging radiation; these devices typically rely on an arrangement of substantial thicknesses of dense metals, usually referred to as a collimator, to provide directional selectivity for radiation. The collimator is 'scanned' across a field of view to create an image. As a result of the thickness of dense metals in the collimator, these devices tend to be bulky and heavy, both undesirable characteristics which limit their application.

Conventional radiation imaging devices constructed using the principle of a scanning field modulator have used tubular field modulators, also known as collimators. Collimators typically comprise a long tube of a dense metal with the detector positioned at one end and the other end open or covered with a thin layer of low density material. The collimator is often improved by adding an additional 'bulb' of dense metal around the radiation detector to improve the signal to noise ratio. The scanning mechanism then sweeps this tube over a defined region of interest, so that each point of the region of interest is visible at the end of the tube at some point during the scan. In this way, a map of radiation magnitude as a function of direction can be constructed, which can be thought of as the radiation equivalent of a photographic image. The drawback with conventional devices is the large size and mass of the collimator, which limits the field of application of such devices.

An alternative approach, known as anti-collimation effectively inverts the process, by replacing the collimator with a rod of material that would perfectly fill the centre of the tube of the original collimator. These devices work by measuring the drop in observed radiation when the rod is pointing in a particular direction. Anti collimation has the advantage that the rod is typically lighter and smaller than the equivalent collimator; however, they can be very difficult to make, because of the need to attempt to avoid occluding any other radiation paths, which complicated the design of the scanning mechanism. Further, the nature of the measurement process places a major limitation on the dynamic range of such systems: the system relies on deducting the observed measurement from a 'background' measurement, which is a statistically poor process. Since the background, in this sense, is the sum of all measurements it must be the case that the signal we are trying to measure for most collimator positions is very much smaller than the background. However, all radiation measurements are characterized by a statistical process sometimes referred to as 'Poisson noise'. This noise has the property that its magnitude is proportional to the square root of the magnitude of the signal. Consider a case in which the background is one million counts per second, and a tubular collimator pointing in a particular direction sees ten counts in a second: it is very likely that the actual count rate lies somewhere between one and twenty counts per second, i.e. the uncertainty is plus or minus ten counts. However, if an anti-collimator pointing in the same direction measured a million less ten counts in a second, the uncertainty on the count rate from that direction is plus or minus one thousand counts—i.e. even though the anti-collimated system has ten thousand times as much radiation to measure, its estimate of the measured value is one hundred times worse than the equivalent conventional collimator. This places a fundamental limitation on the dynamic range that can be achieved with anti-collimation type systems.

JP-A-54-151884 discloses a form of slot collimator for use with a detector in locating a localized radiation source on the basis of trigonometry; however it cannot cope with complex multi-source environments, and is not an imaging apparatus.

A further disadvantage of conventional systems is that an image can only be completed by moving the collimator exhaustively through every pose, which is time consuming. Often, the majority of collimator orientations are uninteresting.

The present invention addresses the shortcomings of conventional systems.

According to one aspect of the present invention, there is provided a radiation imaging apparatus comprising:
a radiation detector;
a field modulator that modulates the radiation that reaches the detector and is defined by a transmission function;
a scanner system for changing the pose of at least the field modulator; and
an image reconstruction section that receives a radiation reading from the radiation detector for each of a plurality of angular orientations of the field modulator, and is configured to process the received readings to derive an image representing the amount of radiation originating from each point in an image domain,
wherein the transmission function of the field modulator comprises a low transmission region that attenuates radiation incident toward the detector from angular directions defined by that low transmission region, and a high transmission region that transmits to the detector radiation that is incident toward the detector from angular directions defined by that high transmission region,
wherein said regions are arranged such that:
for each incident angle in the high transmission region, there is at least one incident angle in the low transmission region that is separated therefrom by less than a first angle, wherein said first angle is 10 degrees; and
for each incident angle in the high transmission region, the majority of other incident angles in the high transmission region are separated therefrom by more than a second angle, wherein said second angle is 20 degrees.

Another aspect of the invention provides a method of scanning a domain using a radiation imaging apparatus as defined above, comprising:
detecting the incident radiation at a plurality of poses of the field modulator, wherein:
for each element in the domain, there is at least one pose in which that element is in a direction with respect to the radiation detector that passes through the high transmission region of the field modulator;
for any pair of first and second elements in the domain that are to be distinguished from each other, there is at least one pose in which the first element is in a direction with respect to the radiation detector that passes through the high transmission region of the field modulator while the second element is in a direction with respect to the radiation detector that passes through the low transmission region of the field modulator, and there is at least one pose in which the first element is in a direction with respect to the radiation detector that passes through the low transmission region of the field modulator while the second element is in a direction with respect to the radiation detector that passes through the high transmission region of the field modulator.

Embodiments of the present invention address the shortcomings of conventional imaging systems by using a field modulator which has a significantly wider aperture for a given resolution than conventional collimators, thereby increasing efficiency and decreasing physical size, but which have much more efficient statistical properties than 'anti-collimators' and can therefore be used to build radiation source imaging systems with very good dynamic range.

In more detail, the angular resolution of a conventional collimator is defined by the size of its aperture. Therefore to achieve fine resolution, the aperture is relatively small. This means that the amount of radiation that reaches the detector from the desired direction is small, and so the signal to noise ratio is potentially low. To improve the signal to noise ratio, one can increase the time taken to sample the radiation, but this makes scans slow, which is undesirable, or one can increase the amount of metal in the collimator (to shield more of the unwanted radiation that constitutes the noise), but this increases the cost, size, and weight of the collimator, and increases the specification of the scanning mechanism needed to support and move the collimator. Again, these are all undesirable. The invention lies in the realization that by an appropriate configuration of the field modulator, the aperture can be increased while maintaining a given resolution. The larger aperture improves the signal to noise ratio so that the scan can be quicker and/or the amount of dense material can be reduced. This is a significant advance because a conventional system may weigh of the order of 50 kg, but an embodiment of the invention can reduce this to less than one fifth of that for the same level of performance (scan time, resolution).

Embodiments of the present invention also enable a radiation image to be reconstructed for an image domain, and can reduce scanning time by adaptively selecting a subset of poses (angular orientations) of the field modulator that cover all of the areas of interest with less effort.

Embodiments of the invention will now be described, by way of example only, with reference to the accompanying drawings in which.

Figure 1:
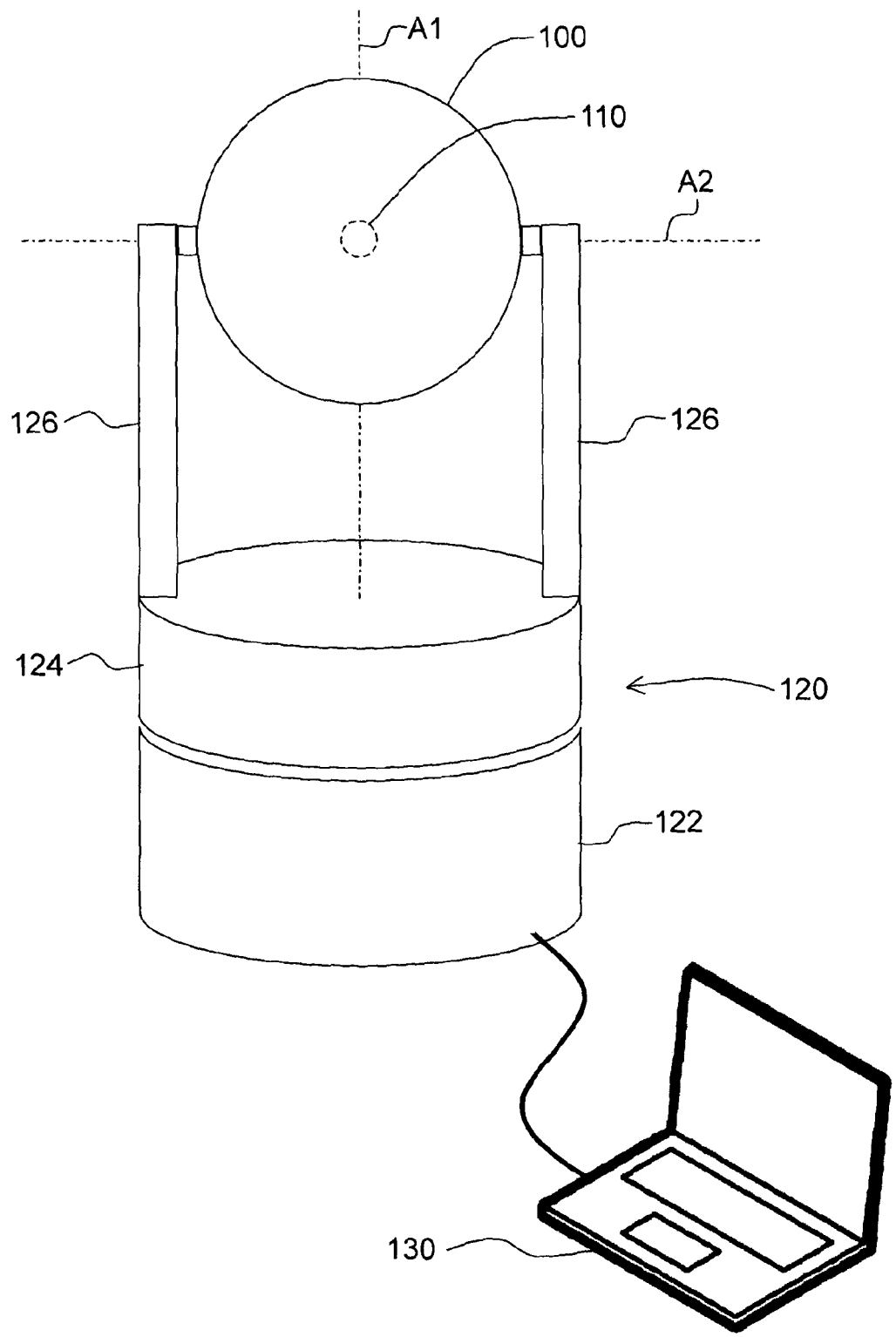
FIG. 1 is a schematic illustration of a radiation imaging apparatus embodying the invention.

FIG. 1 shows an embodiment of a radiation imaging apparatus, comprising a field modulator 100, surrounding a radiation detector 110, both mounted on a scanner system 120. The scanner system 120 comprises a base 122 supporting a turntable 124. The turntable is rotatable through 360 degrees about vertical axis A1. Arms 126 fixed to the turntable 124 pivotably support the field modulator 100, such that, in this example, the field modulator is rotatable through 180 degrees about a horizontal axis A2. Actuators for effecting the rotation are housed in the base 122 and turntable 124, with suitable gears and links to drive the rotations about the respective axes. The actuators can be stepper motors or the like to provide precise rotational control as well as to sense accurately the angular position. Suitable rotatable joints and connections are provided to feed power and signals to and from the radiation detector 110. Alternative forms of scanner system mounting are, of course, possible, such as gimbals with 2 or 3 axes of rotation. In preferred embodiments of the invention, the rotation axes are mutually perpendicular and intersecting.

The apparatus of FIG. 1 can contain electronics to drive the field modulator through a predetermined scan pattern, i.e. sequence of angular poses, and to log the data output by the radiation detector, or the apparatus can be connected to an external computer, 130, to provide the necessary control. An internal and/or external image reconstruction section can be provided for analysis of the data for image reconstruction (discussed below) of the radiation source or sources or general source distribution. The image reconstruction section can be, for example, dedicated electronic hardware or a general purpose programmable computer 130.

The requirements of the field modulator for use in a radiation imaging apparatus of the invention, and a suitable scanning pattern for use in a method of the invention, will now be discussed, followed by specific examples of embodiments of the invention.

Figure 2:
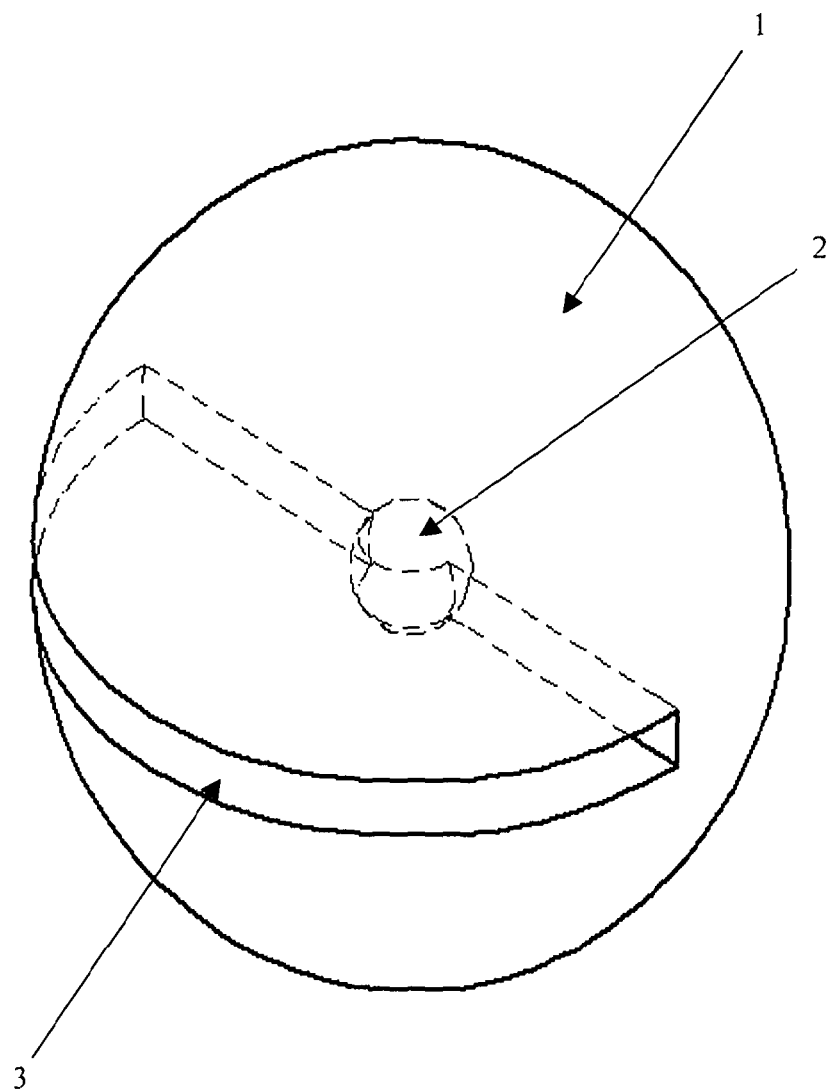
FIG. 2 shows an example of a field modulator for use in an embodiment of the invention.
Figure 3:
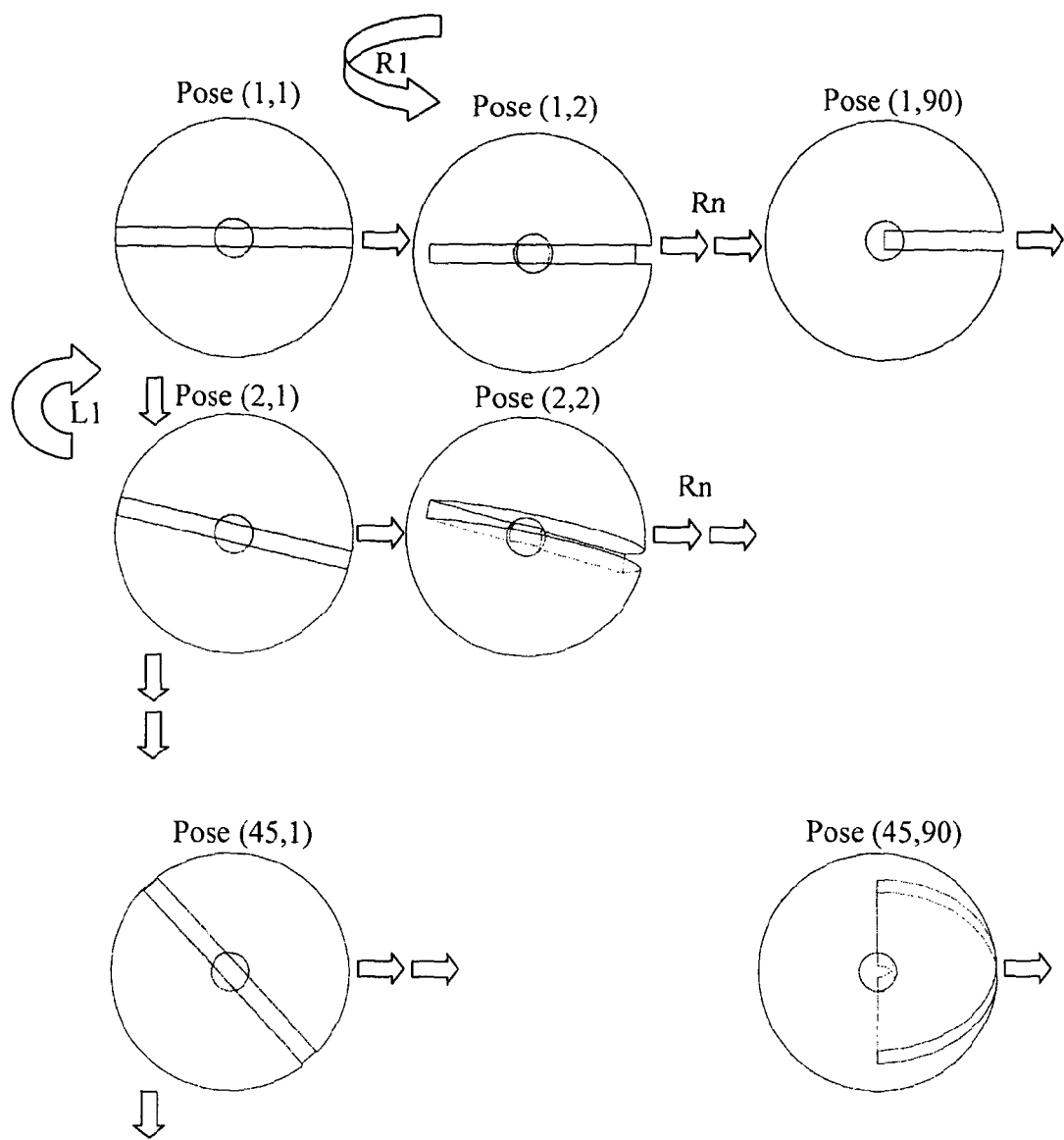
FIG. 3 is a diagrammatic explanation of a scanning pattern for use with the field modulator of FIG. 2.

Field Modulator:

A field modulator is defined as a physical device that modulates the radiation reaching a detector by absorption. The absorption of a field modulator is not constant, but depends on the direction in which the radiation is travelling. An example of a simple field modulator is shown in FIG. 2 and comprises a sphere 1 of dense material with a cavity 2 at its centre to accommodate a radiation detector, and a slot 3 cut through the sphere to reach the cavity. Radiation travelling towards the detector in a direction in the plane of the slot is not absorbed, while the majority of radiation travelling in other directions will be absorbed by the sphere.

A field modulator is characterized by a transmission function. A transmission function, $T(v)$, describes the proportion of incident radiation that is transmitted by the field modulator as a function of direction $v$. The field modulator modulates the radiation flux $\Phi(v)$ so that the flux at the detector becomes $T(v)\Phi(v)$. Embodiments of the present invention include radiation imaging devices with a field modulator that belongs to a particular class of transmission functions, defined as follows.

The transmission function is separated into two notional regions, the high transmission region, H, and the low transmission region, L. The high transmission region would preferably have a transmission value of 1, although other values are possible. The low transmission region would ideally have a transmission as close to 0 as possible. Every direction must be part of either the low transmission or high transmission region, and all the transmission at any direction in H is greater than the transmission at any direction in L:

$$\forall v_H \in H, v_L \in L : T(v_H) > T(v_L)$$

Any transmission function can be partitioned into high and low transmission regions by selecting a threshold C. The threshold C for any given modulator is selected so that it lies equidistant between the mean transmission of H and L:

$$H = \{v : T(v) > C\}$$

$$L = \{v : T(v) \leq C\}$$

$$C = \{c : T_H - c = c - T_L\}$$

Where $T_H$ is the mean transmission T over the high transmission region H, $T_L$ is the mean transmission T over the low transmission region L.

For most field modulators, there will be a unique value of C, however, it is possible for some field modulators to have more than one value of C that satisfies the above definition. For those with more than one value of C, and therefore more than one possible definition of H and L, the modulator will have the intended desirable properties if it complies with the rules described below for any one value of C, even if it does not comply when C takes on other values.

Ideal embodiments of the present invention use one of a family of field modulators with the following properties.

Property 1—Resolving Power:

The high transmission region H is such that for any incident angle $v_H$ that is a member of H, there is at least one member $v_L$ of the low transmission region L such that the angular separation between the two is less than half of the nominal resolution $\beta$:

$$\cos^{-1}(v_H \cdot v_L) < \beta/2$$

Property 2—High Aperture:

The high transmission region H is such that for any incident angle $v_{H1}$ that is a member of H the majority of other incident angles $v_{H2}$ that are also members of H are separated by an angle greater than the nominal resolution $\beta$:

$$\forall \underline{v}_H : \int_{B(\underline{v}_H)} d\Omega < \int_H d\Omega$$

Where:

$$B(v_H) = \{v \in H : \cos^{-1}(v_H \cdot v) > \beta\}$$

The nominal resolution $\beta$ of the field modulator can be given a value of, for example, the average width of the high transmission region, where the width at each point is the distance from a point on one side of the high transmission region to the nearest point on the other side.

The above definition gives a recipe for defining a family of field modulators. In practice, a suitable field modulator will be such that for each incident angle in the high transmission region, there is at least one incident angle in the low transmission region that is separated therefrom by less than a first angle, wherein said first angle is 10 degrees; and for each incident angle in the high transmission region, the majority of other incident angles in the high transmission region are separated therefrom by a more than a second angle, wherein said second angle is 20 degrees. According to preferred embodiments, the first angle is 5 degrees, more preferably 3 degrees, or even 1 degree. According to preferred embodiments, the second angle is at least 40 degrees, more preferably at least 80 degrees. These angles are preferably defined with respect to the detector being at the center or vertex, and are the angles subtended at the detector.

Scanning Pattern

Any field modulator of the type described can be used to make an imaging device by defining a scanning pattern. As with the field modulator, the scanning pattern is defined by a set of mathematical rules. The system can be used to construct either 2D or 3D locating systems. In either case, a source domain is defined; in a 2D system, the domain might be defined by a set of allowed angles from the centre of the imaging apparatus, and the scan would comprise a series of rotations of the field modulator about the centre. For a 3D system, the domain might be a volume, and the scan would comprise a series of translations and rotations in 3D space.

Let the domain be denoted by I, and a point within it be denoted by i. The scan comprises a set S of field modulator poses s, where each s comprises a translation and/or rotation of the field modulator with respect to some origin. The set S can either be continuous or comprise a finite number of discrete poses. A valid scan pattern is then defined by the following properties:

Property 1: Full Sampling

Let $v_{is}$ be the unit normal vector pointing from the detector centre to domain element i under pose s. The property of full sampling is fulfilled if for every element of the domain I there is some pose s for which $v_{is}$ is included in the high transmission region H. This guarantees that each part of the domain is observed at least once. An equivalent expression is to define the domain I as the set of all elements for which the condition holds.

Property 2: Differentiability

For any two domain elements $i_1$ and $i_2$ with angular separation greater than b, where b is the desired source domain resolution, there must be at least one pose $s_1$ for which $v_{i1s1}$ is a member of H and $v_{i2s}$ is a member of L and a second pose $s_2$ for which $v_{i1s2}$ is a member of L and $v_{i2s2}$ is a member of H. This property guarantees that there is at least one pair of poses that enable two locations to be distinguished (resolved) from each other when all other domain values are zero, and is the minimum requirement for an image to be formed. This property alone only allows an image to be formed if significant assumptions about the image can be made.

Property 3: Invertibility

A drawback of scanning systems is that very many sequential readings have to be taken before a complete image can be formed. In many cases this is very unsatisfactory as the majority of the image may contain little of interest. A further advantage of the present family of field modulators is that if it is known a-priori that a finite number of sources are present then it is possible to define a scanning pattern that enables the locations and magnitudes of these sources to be deduced for a far smaller subset of readings.

Consider the spherical field modulator with a slot described above. If this device is rotated such that the slot is orientated at 45 degrees to vertical (i.e. Pose (45,1) in FIG. 1) and then rotated about the vertical axis (i.e. the axis in the plane of the paper from top to bottom), any source within plus or minus 45 degrees of the horizontal plane as seen by the radiation detector will be visible at some point in the rotation. Higher points will be visible later in the rotation and lower points earlier. The rotation at which the source is visible can be identified by looking for the maximum detector response. If this exercise is repeated with the slot rotated to 225 degrees, exactly the same process will occur, however this time the higher the point is the earlier in the rotation it will be visible and vice versa. By symmetry, the average of the two maximum rotation angles must be the azimuth angle of the source. Its altitude angle is half of the difference between the two rotations.

Schemes like this can be devised for an arbitrary number of sources with an arbitrary distribution. An arbitrary constellation of N sources is described by an N-tuple of source locations. To be able to correctly identify an N-Tuple several features are required of the scan pattern: it must be the case that every source location in the N-tuple is visible to the radiation detector in at least one pose. To be able to locate the sources it must be possible to distinguish each possible N-tuple from every other N-tuples, i.e. the tuples must not look exactly the same as each other at every pose in the scan.

A precise definition of this requirement is as follows. Let N be the maximum number of individual elements that must be distinguished. For full imaging capability, $N_d$ is the number of discrete domain elements $I_d$ required to cover the domain I such that no member of I is further than b/2 from a member of $I_d$ i.e.:

$$\forall i \in I, \exists i_d \in I_d : d(i, i_d) < b/2$$

Where d is an appropriately selected distance measure and b is the desired resolution. $N_d$ is the maximum value that N can take on; however, it may be feasible to place an upper bound on the number of discrete sources in the domain by making an application specific assumption. In this case a smaller value $N < N_d$ may be used.

The discrete domain points may be grouped into $_{N_d}C_N$ N-tuples of discrete domain points $i_d$, $\{i_{dj}, i_{dk} \ldots i_{dN}\}$, where $_nC_k$ denotes the binomial coefficient. For each N-tuple, k, and for each pose s in the scan, if one or more member of the tuple is within the H, then we can say that the kth tuple is 'visible' at pose s. For the scan to be fully invertible it is necessary that for every pair of tuples there must be at least one pose at which one of the tuples is visible and the other is invisible.

Image Reconstruction

The following processing is performed by the image reconstruction section. The result of a scan is a set of radiation readings, R, each corresponding to a set of poses S. The desired output is an image representing the amount of radiation originating from each of the discrete domain points $i_{dn}$ in the domain $I_d$. The individual readings, $r_m$, do not relate directly to the individual domain points; however, provided that the invertibility criterion is satisfied, it is possible to calculate the image using a suitable image reconstruction algorithm.

As an intermediate step to reconstruction, a system matrix A is constructed that relates the amount of radiation originating at each point, $i_{dn}$, in the image domain to each reading value, $r_m$.

$$\underline{r} = A\underline{i}$$

Where $\underline{r}$ is a vector of all readings, $\underline{i}$ is a vector of the amounts of radiation emitted from each point in the image domain, and A is the system matrix. Where there are N domain points and M readings, and the pose is of the field modulator is described by a rotation matrix $P_m$, then the contribution of the $n^{th}$ location in the image domain to the $m^{th}$ reading is proportional to $T(P_m^{-1} v_n)$, where T is the field modulator transmission function and $v_n$ is a unit vector with its origin at the reading point, directed at the nth location in the image domain. The matrix A is therefore described by:

$$A_{n,m} = KT(P_m^{-1} v_n)$$

Where K is a calibration factor that describes the sensitivity of the radiation detector. The transmission function T and the calibration factor K can be determined simultaneously in a calibration exercise by rotating the system through each of the poses, in the presence of a plane-parallel radiation field of known magnitude. Alternatively, the values can be determined through a computer simulation of the field modulator design.

The imaging process is completed by using one of the many established techniques for solving matrix equations; Preferably, one of the well-known iterative techniques such as ART (Algebraic Reconstruction Technique) or SIRT (Simultaneous Iterative Reconstruction Technique) are used, with negative values dis-allowed.

Adaptive Scanning

In some instances, it will not be possible to assume a priori that there are a finite number of source locations, but it may still be the case that a complete scan with no restriction on the number of sources would be inefficient. In this case it is possible to use the following adaptive scanning method to accelerate the imaging process.

An initial assumption on the number of sources present is applied and a scanning pattern according to the description above is defined and applied. The number of sources assumed at this stage should be significantly smaller than the likely actual number; 2 is good choice. The image is produced using the method described above. Because an arbitrary and probably false assumption about the number of sources has been applied, the image is likely to be a false representation of reality; however, it will be a valid 'guess' at what the true image might be. This 'guess' can be multiplied by the system matrix A to produce an estimate of what the readings that have yet to be observed might be. The set of predicted readings is used to determine which reading to take next.

One possible way of selecting the next reading is as follows. In any given set of readings, readings that are distinctly different from readings taken with very similar poses are the ones that are the most informative, in the set of predicted readings, those corresponding to poses most similar to those already observed are the most likely to be accurate.

If a scan consists of a discrete set of poses, then the set of poses that are 'neighbours' of the poses in the initial scan can be defined as the set that can be obtained by an incremental rotation of the poses in the initial scan. For example, consider a scan where each pose is achieved by sequential rotation about two perpendicular axes. Each pose can be identified by the two angles of rotation, $\theta$ and $\phi$; the neighbours of any given pose $[\theta, \phi]$ would therefore be $[\theta+\delta\theta, \phi]$, $[\theta-\delta\theta, \phi]$, $[\theta, \phi+\delta\phi]$ and $[\theta, \phi-\delta\phi]$, where $\delta\theta$ and $\delta\phi$ are the incremental angular steps that define the scan pattern. For each of the observed poses the sum of the absolute differences between it and its 4 immediate neighbours can be calculated from the predicted observation data. The pose with the maximum predicted difference from its neighbours is the next observation that should be made.

Once this next observation has been made, the image is re-calculated and is in turn used to re-calculate the predicted readings. The sum of absolute differences is calculated for each of the currently unobserved neighbour poses to the last reading. If any of these is greater than a pre-determined threshold, the neighbour with the greatest sum of absolute distance becomes the next reading to be observed, and the process is repeated.

If none of the neighbours are above the threshold value, then the currently unobserved reading with the highest predicted sum of absolute neighbour differences is located. If the sum of absolute differences for this observation is higher than the threshold, it becomes the next reading to be observed. If it is not, the scan is complete.

The threshold can be determined in several ways; if the imager is being applied to a repetitive task, a good value can be found manually, through experimentation. Alternatively, it can be defined not as an absolute threshold, but with reference to the magnitude of the reading. In this case it is preferable to be define the threshold as a proportion of the square root of the value, as this provides a uniform sensitivity to noise. For example, a good choice is often to set the threshold value such that the sum of absolute differences must be greater than 10 times the square root of the observation value, for an observation to be evaluated.

Specific Embodiment of Radiation Imaging Apparatus and Scanning Method

A field modulator of the family described above can be made using physical matter to absorb radiation. For example, consider a spherical radiation detector contained within a spherical metal ball 1. A slot is cut through one side of the ball to expose the radiation detector, so that the attenuation of radiation by the sphere depends upon the angle of incidence. A scanner is implemented by affixing the field modulator and detector assembly to a mechanical means of rotating them about two axes e.g. a gimbals.

A suitable scanning pattern for this field modulator as follows: Starting from an arbitrary initial denoted Pose (1,1), a radiation reading is recorded and the field modulator is rotated about the vertical axis by a small increment R1, to obtain Pose (1,2).

This process of recording a reading and rotating by a small increment is repeated Rn until the total rotation about the vertical axis is 360 degrees and the field modulator has returned to its original pose.

The filed modulator is now rotated by a small increment about the centerline of the slot L1, to obtain Pose (2,1). The process of taking a reading and followed by an incremental rotation Rn is then repeated.

Finally, this second process of rotating the field modulator incrementally about the centerline of the slot and completing a full rotation about the vertical axis is repeated until the field modulator has rotated through 180 degrees.

The increments in each case should be selected to be smaller than the angular width of the slot, as measured from the centre of the sphere to the outer aperture.

Figure 4:
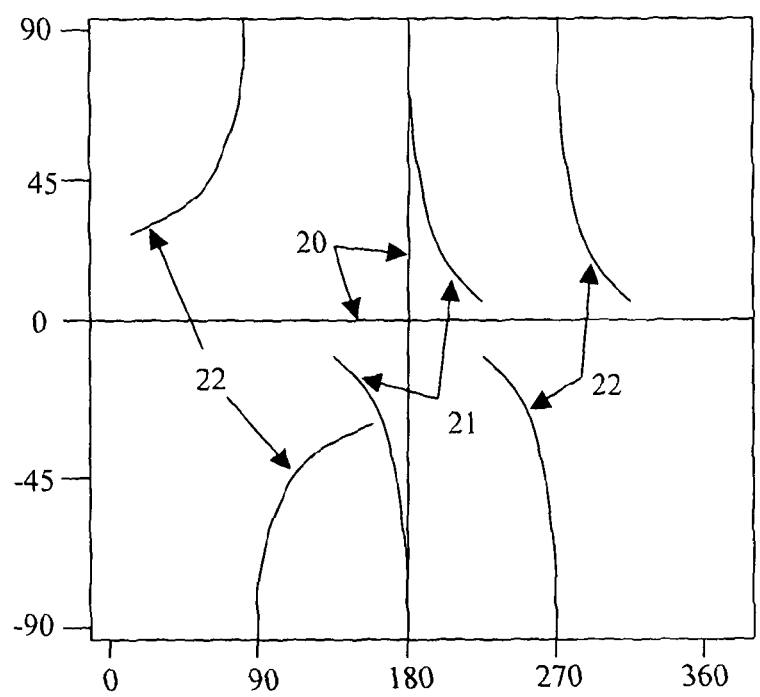
FIG. 4 is a plot of loci of high radiation intensity measurements as a function of angular coordinates of the orientation of the field modulator of FIG. 2.

The output of such a scan is a series of radiation readings each associated with two angles that describe the field modulator pose. If the incremental changes in each of the angles are constant then the radiation readings can be represented by a map, where the increment number for the rotation about the vertical axis corresponds to the x axis position on the map, and the increment number of the rotation about the slot centreline corresponds to the y axis on the map. Each reading then becomes a 'pixel value' in the map. FIG. 4 is a simplified example of such a map, discussed below. The dark lines on the map are the loci of high radiation intensity readings. Although this map is not an image, it can be related to an image as follows.

The position of a source with respect to the detector can be encoded by an altitude angle (or elevation angle) and an azimuth angle, which are analogous to latitude and longitude. A source with zero altitude and azimuth of 180 degrees creates a locus of high readings in the shape of a cross 20, with a horizontal axis through the centre of the map and a vertical axis at 180 degrees. If the altitude of the source is varied the cross develops an asymmetry and splits into two unconnected curves 21. If the upper curve bends to the right, the source has positive altitude and vice versa. If the azimuth of the source is changed, the vertical axis changes accordingly 22. The greater the altitude, the more pronounced the curve 23 (this curve also shows negative altitude and azimuth angle of 90 degrees). From analysis of this map, the angular coordinates of the source or sources with respect to the radiation imaging apparatus can be determined. Full imaging of one or more localized sources or more complex source distributions can, of course, be performed by the image reconstruction technique described above.

FURTHER EMBODIMENTS

Embodiments of the invention are not limited to the above examples.

The field modulator is not restricted to having a single slot-shaped aperture to define the high transmission region. The or each slot need not be straight, but could be curved or angled, such as L-shaped. The modulator could be provided with a number of cylindrical or conical holes forming apertures, in addition to or instead of one or more slots, the holes being spaced at suitable positions around the field modulator to meet the defined criteria. A slot need not extend to 180 degrees around the detector, but could be, for example, 90 degrees, or even up to 360 degrees. This latter case is particularly simple to fabricate as in one example it could comprise two metal hemispheres placed back to back with a spacing between them to define the slot and to accommodate the detector at the center of the resulting body. The aperture widths in any embodiment do not have to be fixed, but could be made adjustable, to provide variable resolution.

The invention is, of course, applicable to a wide range of types of radiation, including both electromagnetic radiation and radiation of particles having mass; for example infrared, optical radiation, x-rays, and nuclear radiation, including gamma rays and neutrons. It is especially applicable to radiation that cannot be readily imaged by conventional optics, for example gamma radiation in the energy range from 10 keV to 10 Mev, and x-rays in the range 1 to 100 keV.

The radiation detector used in the radiation imaging apparatus can comprise any suitable detector sensitive to the radiation from the source to be located, and the detector can be spectroscopic or not. For example in a nuclear application an example of a detector is a so-called 'gamma camera'. Any anisotropy in the sensitivity of the detector can be incorporated mathematically in the transmission function of the field modulator. The detector can comprise a plurality of discrete detectors.

The radiation source imaging apparatus can also be provided with an optical camera mounted on the field modulator, in addition to the radiation detector. The camera is scanned along with the filed modulator to sweep the field of view, and can thereby provide images that are registered with the domain of the radiation source analysis (by taking into account an appropriate angular and spatial off-set of the camera with respect to the radiation detector, e.g. the camera may be mounted on the back of the modulator). In this way, angular coordinates of radiation sources can be related to real world features, such as locations in the optical images of the space being surveyed. An alternative to an optical camera is to use a laser scanner that uses time-of-flight measurements of a pulsed beam of light scattered off surfaces to build up a 3D map of the surrounding surfaces.

The field modulator is preferably fabricated from a dense material, such as lead, tungsten or gold, to provide the low transmission region. The high transmission region can comprise apertures in the low transmission region material or can just be thinner material. The high transmission region can be air-filled or filled with a low attenuation material, such as a plastics material. The field modulator can be a monolithic block, or can be composed of several blocks, or can be a set of nested field modulators.

The invention claimed is:
1. A radiation imaging apparatus comprising:
a radiation detector;
a field modulator that modulates the radiation that reaches the detector and is defined by a transmission function;
a scanner system for changing the pose of at least the field modulator; and
an image reconstruction section that receives a radiation reading from the radiation detector for each of a plurality of angular orientations of the field modulator, and is configured to process the received readings to derive an image representing the amount of radiation originating from each point in an image domain, wherein the transmission function of the field modulator comprises a low transmission region that attenuates radiation incident toward the detector from angular directions defined by that low transmission region, and a high transmission region that transmits to the detector radiation that is incident toward the detector from angular directions defined by that high transmission region, wherein said regions are arranged such that:

for each incident angular direction in the high transmission region, there is at least one incident angular direction in the low transmission region that is separated therefrom by less than a first angle, wherein said first angle is at most 10 degrees; and for each incident angular direction in the high transmission region, the majority of other incident angular directions in the high transmission region are separated therefrom by more than a second angle, wherein said second angle is at least 20 degrees, wherein the image reconstruction section is configured to solve matrix equations relating the radiation readings to the points in the image domain and to the poses of the field modulator.

2. A radiation imaging apparatus according to claim 1, wherein said first angle is half the average angular width of the high transmission region.

3. A radiation imaging apparatus according to claim 1, wherein said second angle is ten times the average angular width of the high transmission region.

4. A radiation imaging apparatus according to claim 1, wherein said first angle is at most 3 degrees.

5. A radiation imaging apparatus according to claim 1, wherein said second angle is at least 40 degrees.

6. A radiation imaging apparatus according to claim 1, wherein the high transmission region comprises one or more discrete sub-regions separated from each other by low transmission regions.

7. A radiation imaging apparatus according to claim 1, wherein the high transmission region comprises at least one slot provided in a material that comprises the low transmission region.

8. A radiation imaging apparatus according to claim 1, wherein said high transmission region comprises all regions of the transmission function of the field modulator with a transmission value greater than a threshold value, and said low transmission region comprises all regions of the transmission function of the field modulator with a transmission value not greater than a threshold value.

9. A radiation imaging apparatus according to claim 8, wherein said threshold value is the transmission value that is equidistant between the mean transmission over the high transmission region and the mean transmission over the low transmission region.

10. A radiation imaging apparatus according to claim 1, wherein for successive radiation readings the scanner system is configured to change to the pose at which a radiation reading has not been obtained that has the maximum predicted difference in radiation reading from its neighbours.

11. A radiation imaging apparatus according to claim 10, wherein the radiation readings are predicted based on readings already taken and the likely radiation image.

12. A method of scanning a domain using a radiation imaging apparatus as defined in claim 1, comprising:

detecting the incident radiation at a plurality of poses of the field modulator, wherein:

for each element in the domain, there is at least one pose in which that element is in a direction with respect to the radiation detector that passes through the high transmission region of the field modulator;

for any pair of first and second elements in the domain that are to be distinguished from each other, there is at least one pose in which the first element is in a direction with respect to the radiation detector that passes through the high transmission region of the field modulator while the second element is in a direction with respect to the radiation detector that passes through the low transmission region of the field modulator, and there is at least one pose in which the first element is in a direction with respect to the radiation detector that passes through the low transmission region of the field modulator while the second element is in a direction with respect to the radiation detector that passes through the high transmission region of the field modulator; and solving, in the image reconstruction section, matrix equations relating the radiation readings to the points in the image domain and to the poses of the field modulator.

13. A method of scanning according to claim 12, wherein said plurality of poses are arranged such that: for substantially every pair of possible combinations of N domain elements, where N is the maximum number of possible radiation sources in the domain, there exists some pose for which at least one element of one combination is within the high transmission region, and all elements of the other combination of the pair are in the low transmission region.

14. A radiation imaging apparatus according to claim 4, wherein said first angle is at most 1 degree.

15. A radiation imaging apparatus according to claim 5, wherein said second angle is at least 80 degrees.

16. A radiation imaging apparatus according to claim 1, wherein the image reconstruction section is configured to obtain an image comprising a value of the radiation originating from each of a set of discrete points in the image domain, corresponding to incident angular directions, by:

calculating a matrix A whose elements are given by:

$$A_{n,m} = KT(P_m^{-1} v_n)$$

where K is a calibration factor defined by the sensitivity of the radiation detector; T is the transmission function of the field modulator; $P_m$ is the rotation matrix describing the mth pose of the field modulator; and $v_n$ is a unit vector with its origin at the reading point of the detector, directed at the nth location in the image domain, solving the equation:

$$\underline{r} = A\underline{i}$$

to obtain $\underline{i}$ which is a vector of the amounts of radiation emitted from each point in the image domain where $\underline{r}$ is a vector of the radiation readings.

17. A radiation imaging apparatus according to claim 1, wherein:

the field modulator comprises a metal ball with a slot cut through one side, to define the low transmission region and high transmission region, respectively; and the scanner system is configured to rotate the field modulator through the following scan pattern, with the radiation detector taking a radiation reading for the pose of the field modulator at each discrete increment of the scan:

(i) incrementally rotating the filed modulator through 360 degrees about a vertical axis;

(ii) rotating the field modulator through an incremental angle about the centerline of the slot; and repeating (i) and (ii) until the slot has been rotated through 180 degrees about its centerline.

* * * * *